United States Patent
Wharton et al.

(10) Patent No.: US 10,068,613 B2
(45) Date of Patent: Sep. 4, 2018

(54) INTELLIGENT SELECTION OF SCENE TRANSITIONS

(71) Applicant: Animoto Inc., San Francisco, CA (US)

(72) Inventors: Tim Wharton, Keighley (GB); Peter Sharp, Brooklyn, NY (US); Stephen J. Clifton, Jersey City, NJ (US)

(73) Assignee: Animoto Inc., San Francisco, CA (US)

( * ) Notice: Subject to any disclaimer, the term of this patent is extended or adjusted under 35 U.S.C. 154(b) by 0 days.

(21) Appl. No.: 15/249,276

(22) Filed: Aug. 26, 2016

(65) Prior Publication Data

US 2017/0062008 A1  Mar. 2, 2017

Related U.S. Application Data

(60) Provisional application No. 62/211,212, filed on Aug. 28, 2015.

(51) Int. Cl.
| | | |
|---|---|---|
| *G11B 27/031* | (2006.01) | |
| *G06K 9/00* | (2006.01) | |
| *G11B 27/034* | (2006.01) | |
| *H04N 5/76* | (2006.01) | |

(52) U.S. Cl.
CPC ........ *G11B 27/031* (2013.01); *G06K 9/00718* (2013.01); *G06K 9/00765* (2013.01); *G11B 27/034* (2013.01); *H04N 5/76* (2013.01)

(58) Field of Classification Search
CPC .......... G06K 9/00718; G06K 9/00765; G11B 27/031; G11B 27/034; H04N 5/76
USPC ......... 382/284; 386/278, 282, 280; 715/723, 715/726
See application file for complete search history.

(56) References Cited

U.S. PATENT DOCUMENTS

| | | | |
|---|---|---|---|
| 8,705,139 B1 | 4/2014 | Snyder | |
| 2003/0095135 A1 | 5/2003 | Kaasila | |
| 2004/0027369 A1* | 2/2004 | Kellock | G11B 27/034 |
| | | | 715/716 |
| 2004/0119715 A1 | 6/2004 | Everett | |
| 2007/0030272 A1 | 2/2007 | Dowling | |
| 2008/0016114 A1* | 1/2008 | Beauregard | G11B 27/005 |
| 2008/0019610 A1* | 1/2008 | Matsuzaka | G06K 9/00711 |
| | | | 382/284 |

(Continued)

OTHER PUBLICATIONS

Wikipedia, "Line Wrap and Word Wrap", https://en.wikipedia.org/wiki/Line_wrap_and_word_wrap, dated May 11, 2016, 7 pages.

(Continued)

*Primary Examiner* — Thai Tran
*Assistant Examiner* — Stephen Smith
(74) *Attorney, Agent, or Firm* — Hickman Palermo Becker Bingham LLP

(57) ABSTRACT

Techniques related to intelligent selection of scene transitions are disclosed. In some example embodiments, a sequence of video segments may be received as input. The video segments may include a first segment that is adjacent to a second segment. Properties of the first segment and the second segment may be detected. The properties may be used to determine one or more categories for one or more transitions for connecting the first segment to the second segment. The one or more categories may be used to determine one or more placements for the one or more transitions. A digital video that includes the one or more transitions may be generated as output.

20 Claims, 11 Drawing Sheets

(56) References Cited

U.S. PATENT DOCUMENTS

| | | |
|---|---|---|
| 2009/0300480 A1 | 12/2009 | Cohen |
| 2010/0021125 A1 | 1/2010 | Ingrosso |
| 2010/0153520 A1 | 6/2010 | Daun |
| 2010/0281383 A1 | 11/2010 | Meaney |
| 2011/0052154 A1* | 3/2011 | Weber .................. G11B 27/034 386/280 |
| 2011/0119573 A1 | 5/2011 | Rudolph |
| 2012/0060095 A1 | 3/2012 | Klappert |
| 2012/0131437 A1 | 5/2012 | Zhu |
| 2012/0198338 A1* | 8/2012 | Flint .................... G11B 27/034 715/726 |
| 2013/0125000 A1 | 5/2013 | Fleischhauer |
| 2014/0133834 A1* | 5/2014 | Shannon ................ H04N 9/80 386/278 |
| 2014/0237065 A1 | 8/2014 | Kloba |
| 2014/0320540 A1 | 10/2014 | Deach |
| 2015/0078733 A1 | 3/2015 | Popkiewicz |
| 2015/0294687 A1* | 10/2015 | Buick ................. G11B 27/036 386/280 |
| 2016/0196044 A1* | 7/2016 | McGill ................ H04N 5/262 715/720 |
| 2016/0293216 A1 | 10/2016 | Tost |
| 2017/0011264 A1* | 1/2017 | Smolic ............... G06K 9/00711 |
| 2017/0091558 A1 | 3/2017 | Smolic |

OTHER PUBLICATIONS

Stupeflix, Make videos online with photos, clips, musicm, https://studio.stupeflix.com/en/, dated Jun. 8, 2015, 1 page Shakr—Online Video Maker, https://www.shakr.com/, dated Jun. 8, 2016, 1 page.

Paths—SVG 1.1 (Second Edition), W3C Recommendation, dated Aug. 16, 2011, https://www.w3.org/TR/SVG/paths.html#PathData, 46 pages.

Litherum: End-To-End Tour of Text Layout/Rendering, http://litherum.blogspot.com/2015/02/end-to-end-tour-of-text-rendering,html, dated Feb. 27, 2015, 9 pages.

Glyph Metrics, FreeType Glyphs Conventions/III, Baseline, Pens and Layouts, https://www.freetype.org/freetype2/doc/glyphs/glyphs-3.html, dated Dec. 7, 2014, 6 pages.

Canva, Amazingly Simple Graphic Design Software, https://www.canva.com/, dated Jun. 8, 2016, 1 page.

Adobe Spark, "Communicate with Impact", https://spark.adobe.com/, dated Jun. 8, 2016, 1 page.

Wombell, U.S. Appl. No. 15/177,632, filed Jun. 9, 2016, Final Office Action, dated Jan. 9, 2018.

Wombell, U.S. Appl. No. 15/177,632, filed Jun. 9, 2016, Notice of Allowance, dated Mar. 15, 2018.

Wombell, "U.S. Appl. No. 15/177,632, filed Jun. 9, 2016," Notice of Allowance, dated Mar. 15, 2018.

* cited by examiner

Figure 5

Set of Prioritized Rules 500

| Criteria 502 | Categories 504 |
|---|---|
| First Block and Second Block Have the Same Background Color | None => Global Cut Transition => None |
| First Block and Second Block Have Different Background Colors | None => Any Global Transition => None |
| First Block and Second Block Each Have Video or Multiple Images | Out Transition => Global Cut Transition Having a Background Color => In Transition |
| First Block Has Video or Multiple Images and Second Block Does Not | Out Transition => None |
| Second Block Has Video or Multiple Images and First Block Does Not | None => In Transition |
| First Block and Second Block Each Have Text over an Image | None => In Transition |
| First Block Has Text over an Image and Second Block Does Not | Out Transition => None |
| Second Block Has Text over an Image and First Block Does Not | None => In Transition |
| None of the Above Criteria are Applicable | None => Any Global Transition => None |

Highest Applicable Rule 506

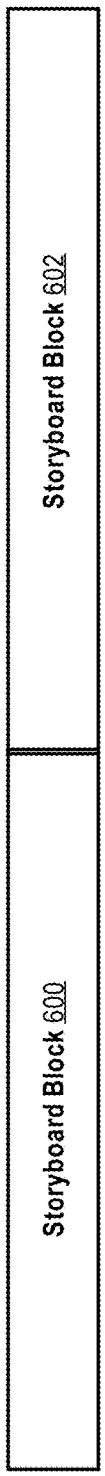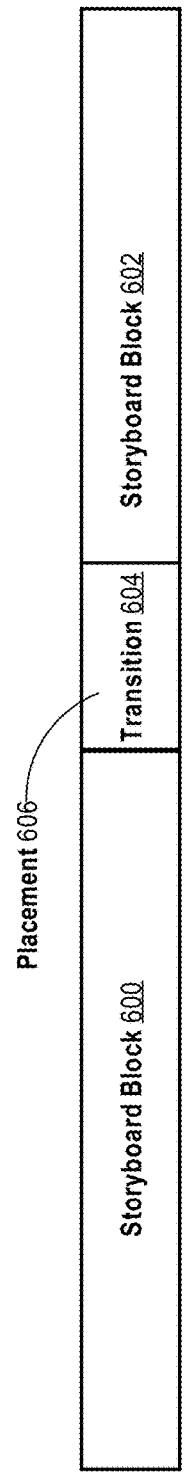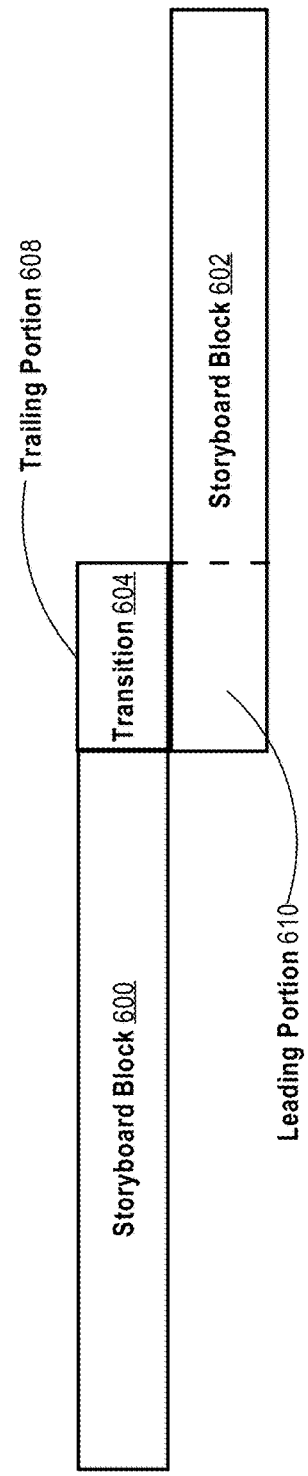
*Figure 6A*
*Figure 6B*
*Figure 6C*

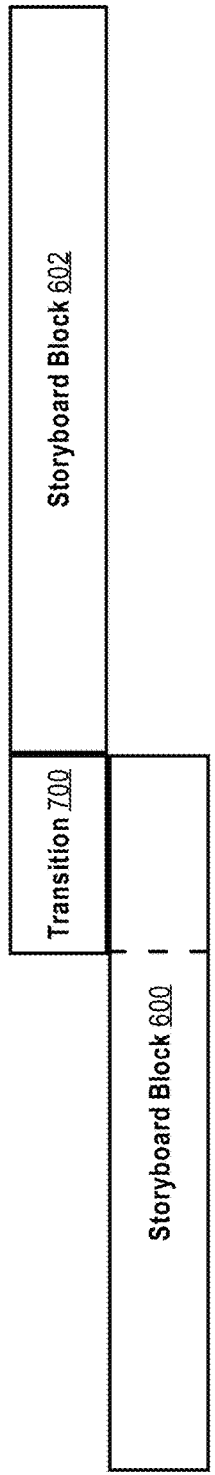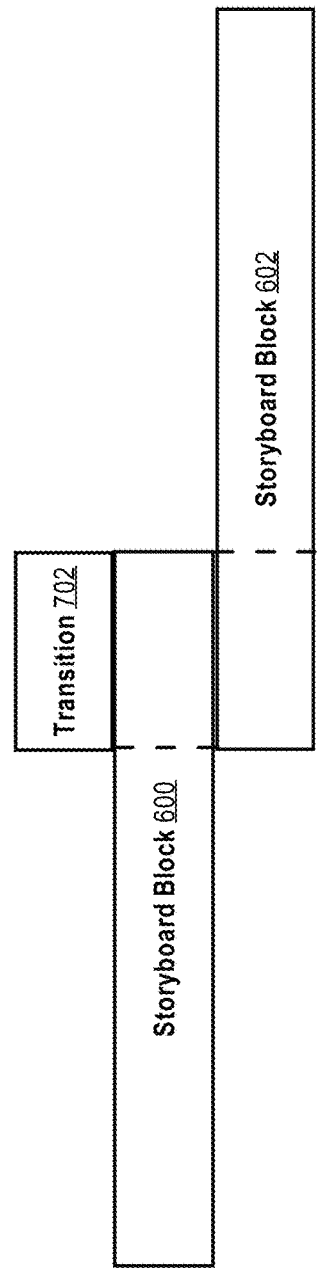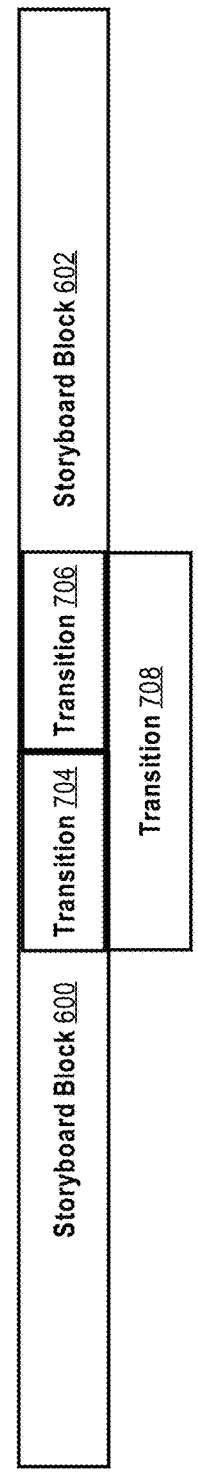

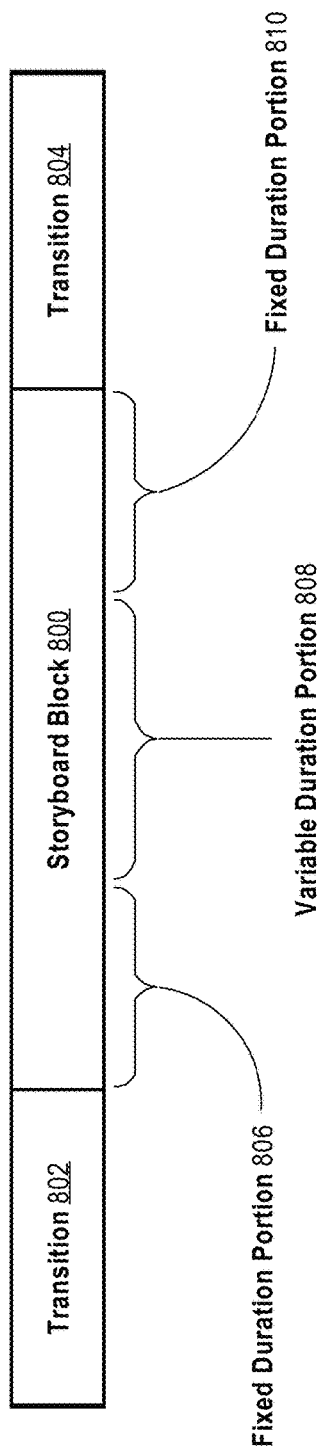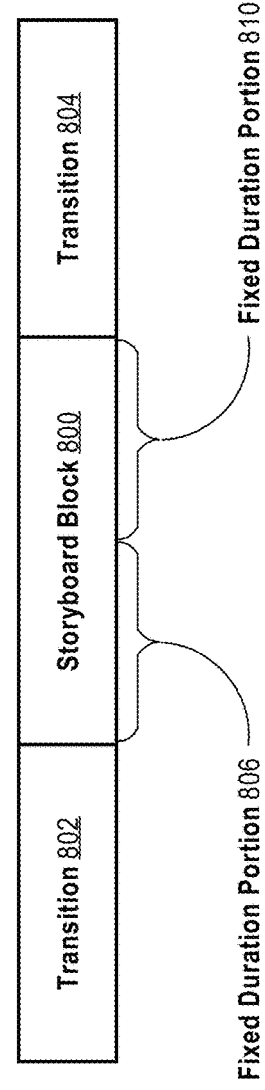

INTELLIGENT SELECTION OF SCENE TRANSITIONS

CROSS-REFERENCE TO RELATED APPLICATIONS; BENEFIT CLAIM

This application claims the benefit of Provisional Appln. 62/211,212, filed Aug. 28, 2015, the entire contents of which is hereby incorporated by reference as if fully set forth herein, under 35 U.S.C. § 119(e).

TECHNICAL FIELD

Embodiments relate to artificial intelligence in video post-production. More specifically, the embodiments relate to intelligent selection of scene transitions. The suggested art unit is 2121.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An audiovisual presentation can be a powerful medium for conveying spoken or unspoken ideas to an audience. A high-quality audiovisual presentation can lead its audience through a range of emotions based on properly orchestrated effects. Conversely, a low-quality audiovisual presentation can leave its audience with a negative impression that has no basis in the substantive content of the presentation.

However, creating a high-quality audiovisual presentation typically involves considerable expertise. For example, creating a sophisticated video involves skill in designing visually appealing transitions between different segments of the video. Unfortunately, such expertise is not widely available. Thus, professional video production firms may charge between $2,500 USD and $10,000 USD for creating a two to three minute video, thereby making professional-quality videos cost prohibitive for many interested parties.

There exist digital video editing systems that enable users to edit digital videos at a fraction of the cost of hiring a professional. Although these systems facilitate video editing to some extent, they produce videos that merely reflect the skill levels of the users. Thus, the resulting videos often resemble animated slideshows with choppy and/or repetitive transitions between scenes.

Thus, there is a need for a video editing system that has the intelligence of a professional video editing and effects designer.

BRIEF DESCRIPTION OF THE DRAWINGS

FIG. 5 is a table that illustrates an approach for determining transition categories.

FIGS. 6A-C illustrate an approach for determining a placement for an OUT transition category.

FIGS. 7A-C illustrate other example transition categories.

FIGS. 8A-B illustrate fixed and variable portions of an example storyboard block.

Figure 1:
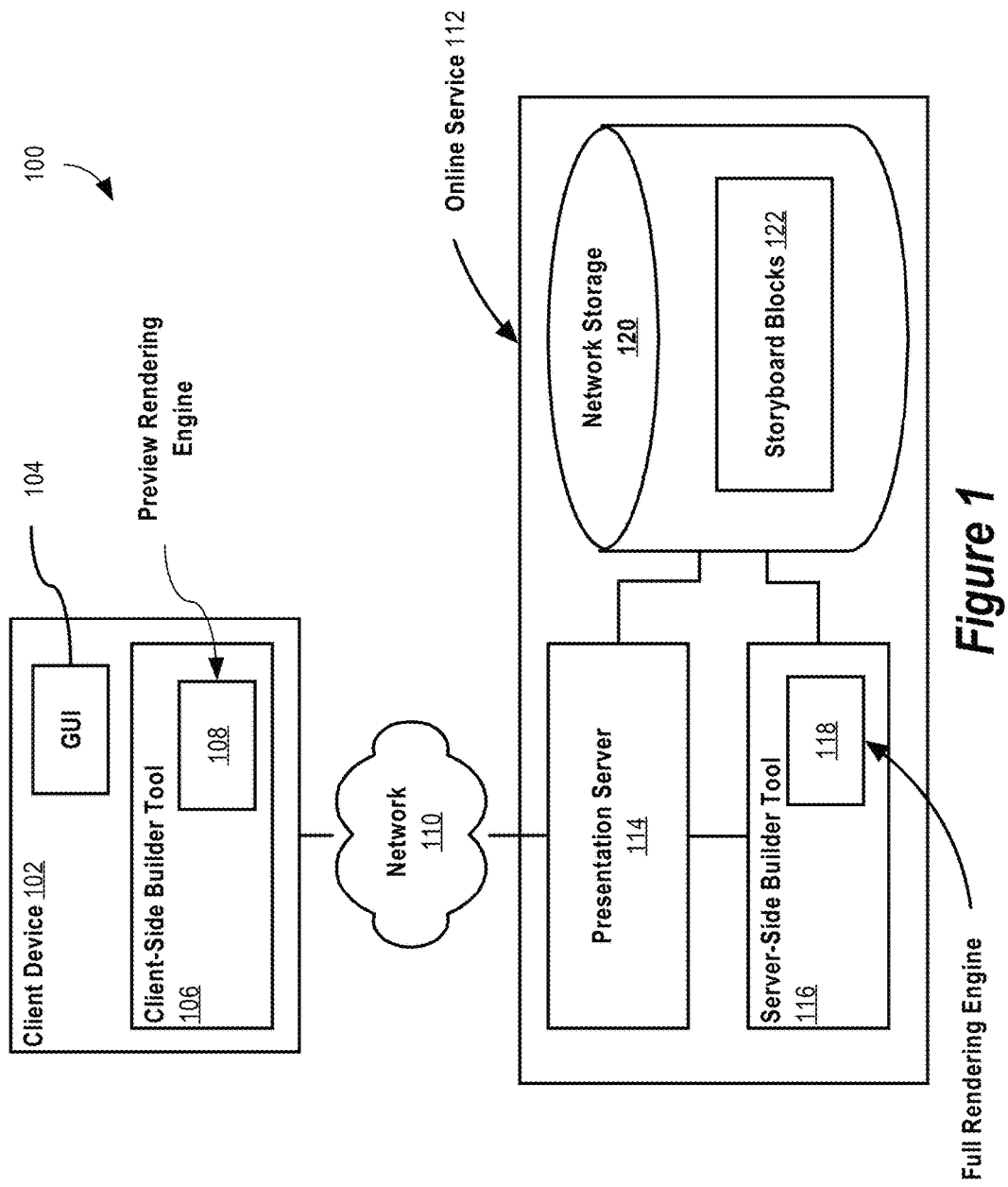
FIG. 1 illustrates an example computer architecture on which embodiments may be implemented.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Introduction

In some example embodiments, a digital video editing system receives, as input, a sequence of storyboard blocks that include user-provided media elements, such as text, image, or video. The digital video editing system automatically selects and places transitions that connect the storyboard blocks into a digital video. Significantly, this automated process is performed according to an algorithm that simulates the decision-making process of a professional video editing and effects designer.

The algorithm may iteratively analyze pairs of adjacent storyboard blocks. For example, the algorithm may involve detecting media elements included in the adjacent storyboard blocks. A predetermined set of rules may correlate the media elements to types of transitions that would serve as visually appealing connections between the adjacent storyboard blocks. Each type of transition may involve placing a transition where it can exert control over or be controlled by one or more storyboard blocks. Selection of the transition may be tailored to characteristics of the one or more storyboard blocks that exert control over or are controlled by the transition.

System Overview

FIG. 1 illustrates a networked system environment 100 on which embodiments may be implemented. Environment 100 includes a client device 102 coupled to an online service 112 via a data network 110.

The client device 102 includes a graphical user interface 104 and a client-side portion 106 of a digital video builder tool. The client-side builder tool 106 includes a preview rendering engine 108.

The online service 112 includes a presentation server 114, a server-side portion 116 of the digital video builder tool, and a network storage 120. The server-side builder tool 116 includes a full rendering engine 118. The network storage 120 stores storyboard blocks 122.

The client device 102 may be a desktop computing device, a laptop computing device, a smartphone, a tablet, or other general-purpose computer configured to execute the client-side builder tool 106. The client device 102 may include hardware elements like those of computing device 1000 in FIG. 10 and a software system like that of software system 1100 in FIG. 11.

The data network 110 may any data network suitable for facilitating Internet Protocol (IP)-based communication between the client device 102 and the online service 112. For example, the data network 110 may be the Internet or other IP-based data network. Communication over the data network 110 between the client device 102 and the online service 112 may occur according to a variety of different IP-based network communications protocols including, but not limited to, Hypertext Transfer Protocol (HTTP) or Hypertext Transfer Protocol Secure (HTTPS).

Figure 10:
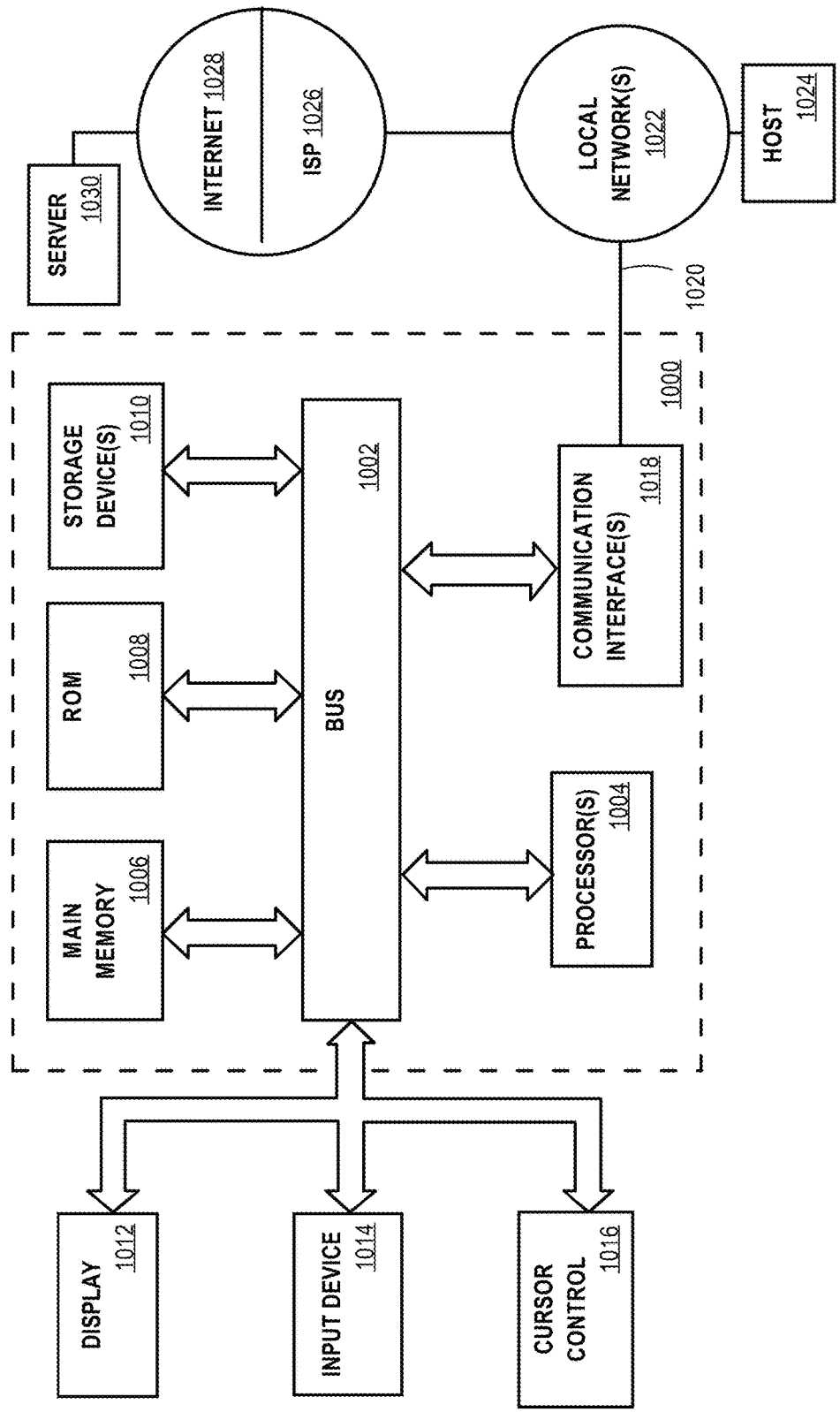
FIG. 10 is a block diagram of an example computer system upon which an embodiment may be implemented.

The online service 112 may be implemented by one or more server computing devices including hardware similar to that of computing device 1000 of FIG. 10. Each server computing device may be configured with a software system, such as the one in FIG. 11. If online service 112 is implemented by multiple server computing devices, the server computing devices may be interconnected according to a distributed computing arrangement.

In some example embodiments, the online service 112 may be an Internet web site that provides users the ability to automatically generate audiovisual works. For example, online service 112 may be the ANIMOTO® cloud-based video creation service, provided by Animoto Inc. of San Francisco, Calif., which produces animated digital videos from digital photos, video clips, and music.

The digital video builder tool may be a set of instructions for creating a digital video. The set of instructions may include the client-side portion 106 that executes at the client device 102 and the server-side portion 116 that executes at the online service 112.

The client device 102 may download the client-side portion 106 from the online service 112 over the data network 110. In some example embodiments, the client-side portion 106 is implemented by client-side web application instructions suitable for execution by a compatible web browser application that also executes on the client device 102. Such client-side web application instructions may include a combination of Hypertext Markup Language (HTML), Cascading Style Sheets (CSS), and JAVASCRIPT® instructions. The web browser application may be, for example, GOOGLE® CHROME®, MICROSOFT® INTERNET EXPLORER®, or the like. Additionally or alternatively, the client-side portion 106 may be implemented via a native mobile app or other instructions dedicated to executing the client-side portion 106.

In some example embodiments, the client-side portion 106 may include instructions for editing a digital video. In other words, a digital video editing system may be a subsystem of a digital video creation system. Thus, the digital video editing system may adhere to a client-server model. Additionally or alternatively, the digital video editing system may operate locally on the client device 102 with or without a network connection. For example, client-side scripts may be used to perform all video editing operations on the client device 102.

The client-side builder tool 106 may include the preview rendering engine 108 for generating a preview of a digital video based on a current configuration of the storyboard blocks 122, which will be described in further detail below. The preview rendering engine 108 may be a WebGL-based rendering engine of a supporting web browser application. WebGL is a cross-platform, royalty-free web standard for a low-level 3D graphics API based on OpenGL ES 2.0, exposed through the HTML5 Canvas element as Document Object Model interfaces.

The server-side portion 116 of the digital video builder tool generates the digital video based on a particular configuration of the storyboard blocks 122. For example, the server-side builder tool 116 may receive the particular configuration that was specified at the client device 102. Then, the server-side builder tool 116 may cause the storyboard blocks 122 to be configured according to the particular configuration. Using the full rendering engine 118, the server-side builder tool 116 may generate the digital video based on the storyboard blocks 122 as configured.

The graphical user interface 104 may enable interaction between a user and the digital video builder tool. The graphical user interface 104 may be presented within a window, such as a web browser window or other graphical user interface window. A user may interact with the graphical user interface 104 to provide input to the digital video builder tool using any of a variety of input mechanisms. For example, the user may interact with the graphical user interface 104 to specify media elements for the storyboard blocks 122. Media elements will be described in further detail below.

The presentation server 114 is responsible for receiving and responding to network requests sent from the client device 102 over the data network 110. In doing so, presentation server 114 may interface with the server-side builder tool 116 and network storage 120. For example, after the server-side builder tool 116 generates the digital video, the presentation server 114 may send the digital video or a link to the digital video over the data network 110 toward the client device 102.

The network storage 120 may be implemented by any of a variety of network storage mechanisms or services. For example, the network storage 120 may comprise one or more data storage devices operatively coupled to the data network 110. The network storage 120 may store data as one or more files. The data may include the storyboard blocks 122 and/or templates (not shown) from which the storyboard blocks 122 are compiled. Example templates include scene specifications as described in Provisional Appln. 62/211, 212.

Storyboard Blocks

Each of the storyboard blocks 122 may correspond to a different segment of the digital video to be generated. Different segments may be characterized by content that is sufficiently different as to warrant connecting the different segments using transitions. These transitions may provide unity or fluidity between segments with boundaries that would otherwise be demarcated by an abrupt change in content.

Each of the storyboard blocks 122 may be a compiled version of a template that has been created a priori for use with all or part of system environment 100. In some example embodiments, templates may be created by a professional or highly skilled video effects designer using professional video editing and effects software. Each of the storyboard blocks 122 may correspond to a particular template of a library of templates maintained in the network storage 120. Among other things, a template may specify types of media elements and relative locations of the media elements.

Each of the storyboard blocks 122 may be user-configurable. A user may specify which media elements to include in a particular storyboard block. The user may also specify certain characteristics of the media elements. The characteristics may include an anchor position of a media element, a size of a media element, and/or a color of a media element.

Figure 2:
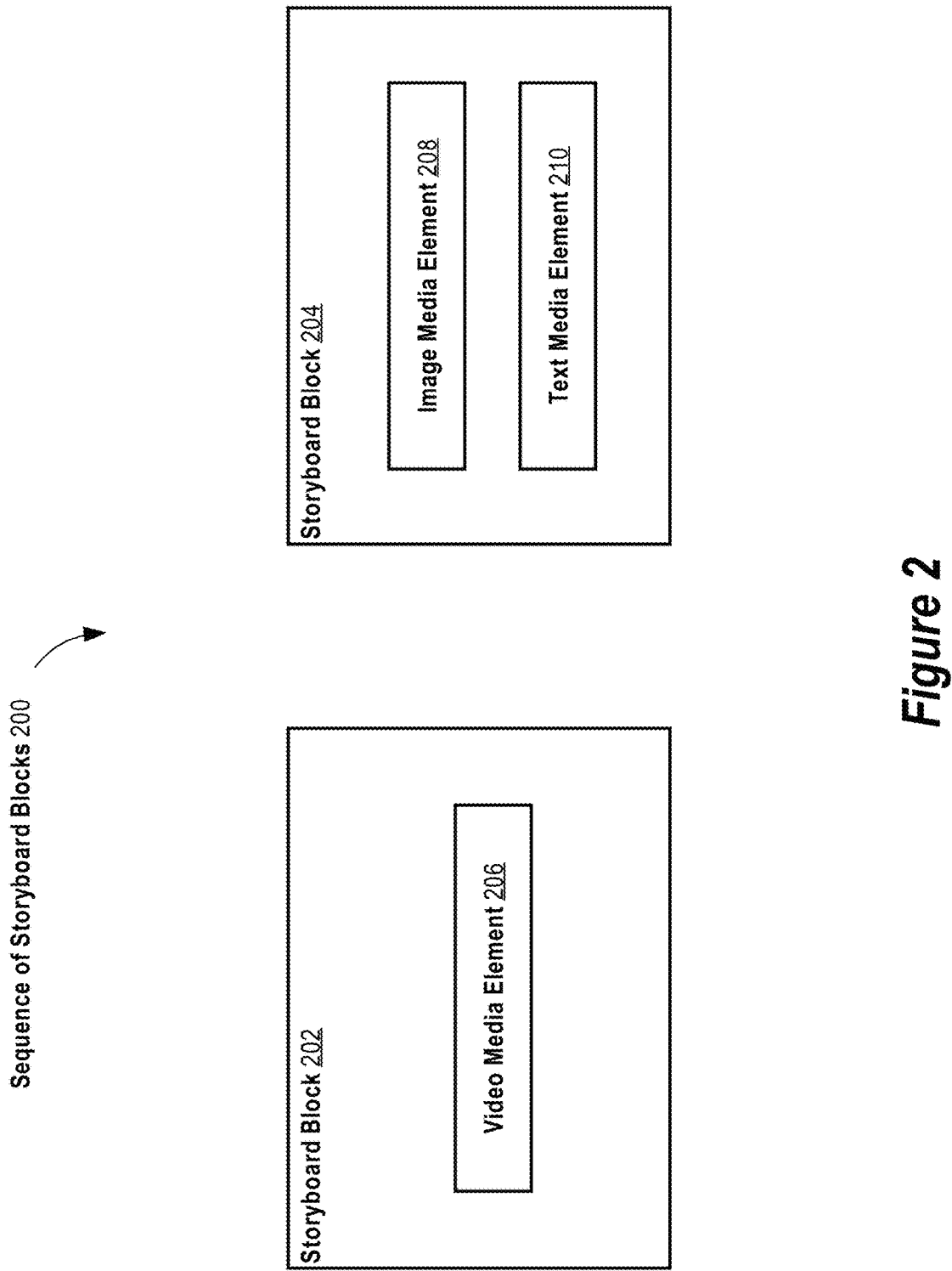
FIG. 2 illustrates an example sequence of storyboard blocks.

Referring to FIG. 2, a storyboard block 202, 204 may include a video media element 206, an image media element 208, a text media element 210, and/or any other type of media element. For example, a user may upload a video clip of a coffee shop for insertion into storyboard block 202 and may upload an image of a brand logo for insertion into storyboard block 204. Additionally, the user may enter a campaign slogan into a text box in storyboard block 204. Any media elements that are uploaded, entered, or otherwise received as user input may be stored in the network storage 120.

Figure 3:
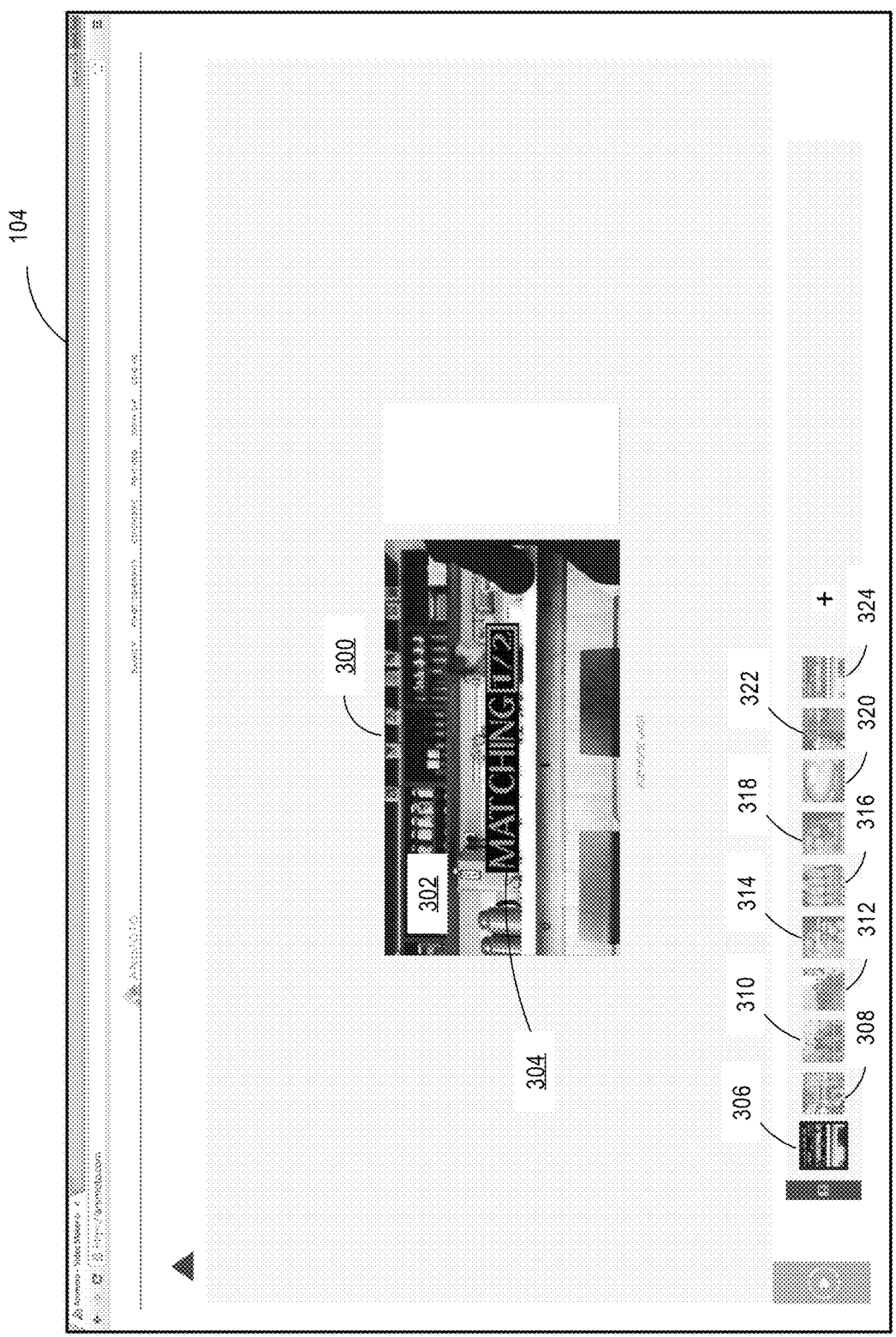
FIG. 3 illustrates example storyboard blocks.

A storyboard block 202, 204 may correspond to a predefined type based on which media elements are included in the storyboard block 202, 204. FIG. 3 provides some examples of different types of storyboard blocks. Each storyboard block may include metadata indicating a particular storyboard block type. Thus, the metadata may indicate one or more types of media elements.

Referring to FIG. 3, graphical user interface 104 displays a static visual representation 300 of storyboard block 306. The static visual representation 300 may be used for interactive editing and providing a preview on the client device 102. The static visual representation 300 may include a first video frame 302 of a video clip along with a logo image 304 overlaying the first video frame 302. Thus, storyboard block 306 may correspond to a "Logo+Media" storyboard block type. As used herein, "Logo" corresponds to a logo image, and "Media" corresponds to a video clip or an image that is not a logo or a monochromatic background. Another example of this storyboard block type is illustrated in storyboard block 324.

Storyboard blocks 308-324 illustrate some other possible storyboard block types. Storyboard blocks 308 and 322 correspond to a "Media+One Line" storyboard block type. As used herein, "One Line" corresponds to a line of text. Storyboard blocks 310-312 correspond to a "Media Only" storyboard block type. Storyboard block 314 corresponds to a "Media+Multiple Lines" storyboard block type. As used herein, "Multiple Lines" corresponds to multiple lines of text. Storyboard blocks 316-320 correspond to a "Media+Caption" storyboard block type. As used herein, "Caption" corresponds to text describing an image or video.

FIG. 3 does not provide an exhaustive list of possible storyboard block types. Any number of different combinations of media elements are possible. For example, a "One Line" storyboard block type may correspond to a line of text overlaid on a monochromatic background image; a "Multiple Lines" storyboard block type may correspond to multiple lines of text overlaid on a monochromatic background image; a "Logo" storyboard block type may correspond to an image and text overlaid on a monochromatic background image; and a "N-image collage" storyboard block type may correspond to N images that are simultaneously presented.

A user may also specify an ordering or arrangement of selected storyboard blocks. In some example embodiments, the ordering or arrangement may be predefined in a storyboard template. Storyboard templates may be created a priori for use with all or part of system environment 100. In some example embodiments, storyboard templates may be created by a professional or highly skilled video effects designer using professional video editing and effects software. Additionally or alternatively, storyboard templates may be automatically generated based on an existing digital video that a user provides as input to the digital video builder tool. For example, storyboard blocks 306-324 may correspond to a storyboard template for a food or drink service establishment. Thus, storyboard blocks 306-324 may represent a sequence 200 of two or more storyboard blocks.

Figure 4:
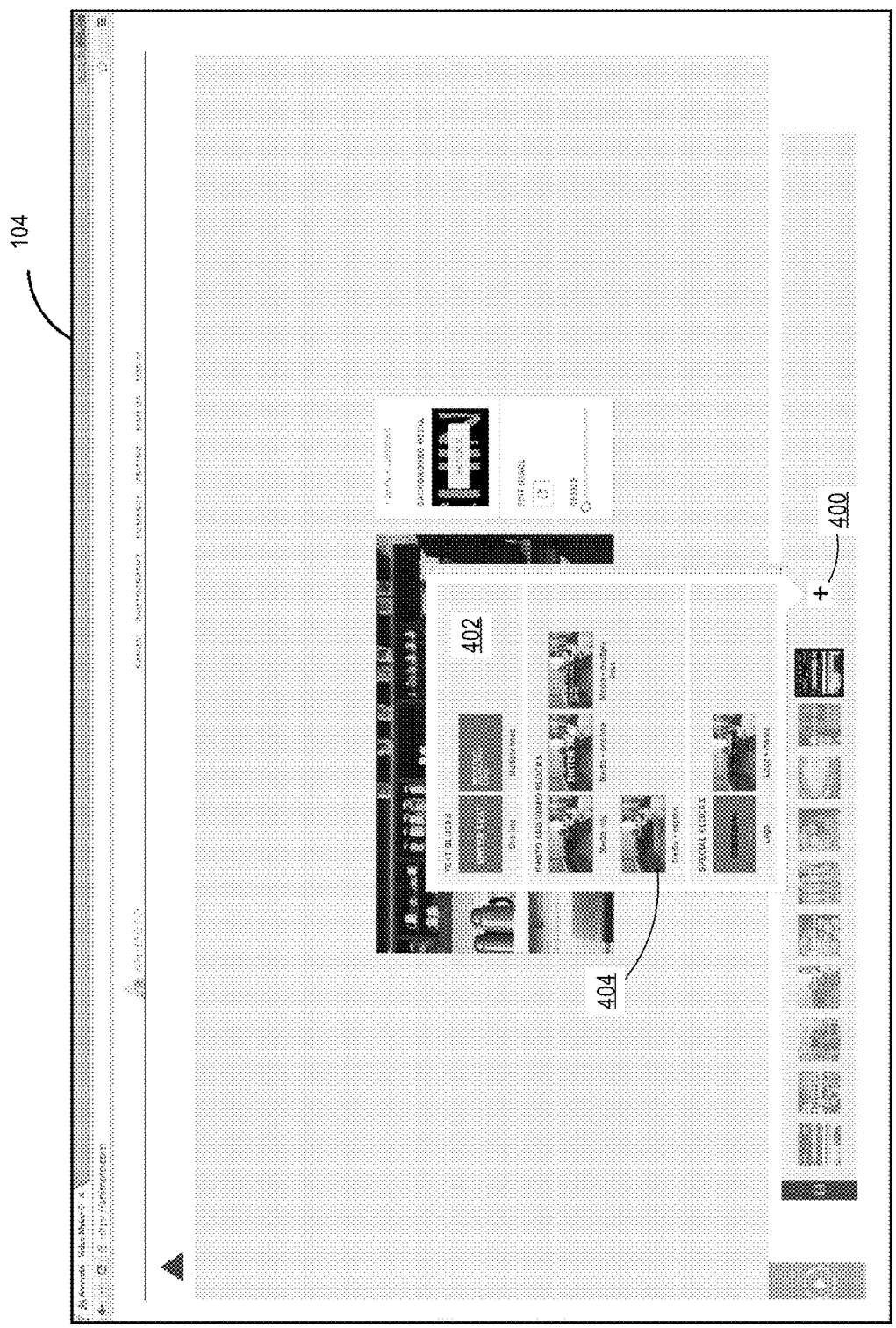
FIG. 4 illustrates an approach for adding a storyboard block.

The storyboard template may be customized based on adding or deleting particular storyboard blocks. In the example of FIG. 4, storyboard block 404 is appended to the storyboard template based on selecting a user interface control 400 and interacting with a dialog 402 that displays a variety of selectable storyboard block types.

In some example embodiments, a user may specify a desired duration for a particular storyboard block. Additionally or alternatively, a particular duration may be automatically determined by the system. For example, the particular duration may be automatically calculated based on estimating an amount of time that an average user may take to read a particular text media element. Additionally or alternatively, the particular duration may be automatically adjusted based on a musical analysis to time a particular video media element in an aesthetically pleasing manner. Additionally or alternatively, the particular duration may be automatically adjusted to keep a particular digital video within a desired total duration.

Categorization Rules

The sequence of storyboard blocks 200 may be provided as input to a digital video editing system that automatically connects the storyboard blocks into a digital video. This automatic process may involve analyzing pairs of adjacent storyboard blocks to determine an aesthetically pleasing transition between adjacent storyboard blocks. Furthermore, this automatic process may be performed iteratively for each pair of adjacent storyboard blocks in the sequence of storyboard blocks 200.

The digital video editing system may algorithmically determine one or more transition categories for a pair of adjacent storyboard blocks. Each transition category indicates a type of transition. Example transition categories include, without limitation, an IN transition category, an OUT transition category, a GLOBAL transition category, and a GLOBAL CUT transition category. The digital video editing system may select one or more transitions based on the one or more transition categories that have been algorithmically determined. For example, a GLOBAL transition category may include a fade transition, a dissolve transition, or a split transition. Thus, the digital video editing system may select the split transition based on characteristics of the adjacent storyboard blocks. Transition categories may be differentiated based on their placements relative to adjacent storyboard blocks. Transition placements will be described in further detail below.

The one or more transition categories may be determined based on a number of categorization rules. A categorization rule may correlate detected block properties to transition categories. In the example of FIG. 5, the categorization rules are a set of prioritized rules 500 including criteria 502 that correspond to categories 504. The categorization rules of FIG. 5 are prioritized from top to bottom, with the highest priority rule being the first prioritized rule located at the top of the table. Starting with the first prioritized rule, the digital video editing system may determine whether or not particular criteria are satisfied by the pair of adjacent storyboard blocks. The particular criteria may specify a particular combination of media elements. If the particular criteria are satisfied by the pair of adjacent storyboard blocks, the digital video editing system has determined a highest applicable rule 506 for the pair of adjacent storyboard blocks. Accordingly, one or more categories 504 specified by the highest applicable rule 506 are associated with the pair of adjacent storyboard blocks. If the particular criteria are not satisfied by the pair of adjacent storyboard blocks, the digital video editing system proceeds to the next prioritized rule.

For example, metadata for storyboard blocks 202 and 204 may be analyzed based on the set of prioritized rules 500. The first prioritized rule applies to adjacent blocks with the same background color. This rule does not apply, because storyboard block 202 has a full-frame video instead of a background image. The second prioritized rule applies to adjacent blocks with different background colors. Again, this rule does not apply. The third prioritized rule applies to adjacent blocks that each have video or multiple images. This rule does not apply, because storyboard block 204 only has a single image. The fourth prioritized rule applies to adjacent blocks in which the first block, but not the second block, has a video or multiple images. This rule applies to storyboard blocks 202 and 204. Thus, the most aesthetically pleasing transition between storyboard blocks 202 and 204 belongs to the OUT transition category.

Other examples of categorization rules may include rules that are based on properties of more than two storyboard blocks. For example, a categorization rule may consider properties of all storyboard blocks in a sequence. The properties may include durations of storyboard blocks, musical analyses of storyboard blocks, video content analyses of storyboard blocks, etc. In some example embodiments, a particular categorization rule may be ignored in favor of another categorization rule if the particular categorization rule specifies a particular transition that has been selected too often, if a particular storyboard block is longer or shorter than a predetermined duration, or if a particular transition would be placed too close to a strong musical section boundary.

In some example embodiments, the categorization rules are customizable. Rule customization may be performed manually or automatically. For example, a system administrator may add, modify, or delete one or more rules in the set of prioritized rules 500. Additionally or alternatively, the digital video editing system may add, modify, or delete one or more rules based on detecting patterns in user feedback, such as confirmations or rejections provided by a user in response to a video preview. The patterns may be detected based on machine-learning or any other heuristics.

Transition Placements

Based on determining one or more transition categories for a pair of adjacent storyboard blocks, a digital video editing system may determine one or more transition placements. A transition placement may be any of a variety of positions relative to a storyboard block. Example transition placements include above, below, before, and after a storyboard block.

For example, an OUT transition category may be algorithmically determined to be appropriate for connecting adjacent storyboard blocks, such as storyboard blocks 202 and 204. A transition belonging to the OUT transition category is a set of instructions in a storyboard block that controls how the storyboard block transitions out and how a subsequent storyboard block transitions in. Thus, the OUT transition category may be a wipe that matches the movement of the barista in storyboard block 202 to gradually reveal storyboard block 204.

FIGS. 6A-C illustrate an approach for determining a placement for an OUT transition category. FIG. 6A illustrates a pair of adjacent storyboard blocks that includes storyboard blocks 600 and 602. Note the boundary between storyboard blocks 600 and 602. FIG. 6B is a top-down view of a placement 606 for transition 604. Transition 604 belongs to an OUT transition category that extends storyboard block 600 and overlaps part of storyboard block 602. FIG. 6C is a profile view of the placement 606. Transition 604 corresponds to a trailing portion 608 of storyboard block 600. Furthermore, transition 604 overlaps a leading portion 610 of storyboard block 602. Note that the leading portion 610 does not correspond to any transition. Thus, transition 604 exerts control over the leading portion 610.

FIGS. 7A-C illustrate some other example transition categories. Note that combinations of transition categories other than those that are not shown are also possible.

FIG. 7A illustrates an IN transition category. A transition belonging to the IN transition category is a set of instructions in a storyboard block that controls how the storyboard block transitions in and how a previous storyboard block transitions out. Transition 700 belongs to an IN transition category that corresponds to a leading portion of storyboard block 602 and overlaps a trailing portion of storyboard block 600. Thus, transition 700 exerts control over the trailing portion of storyboard block 600. For example, transition 700 may be a slide-up movement that matches the upward movement of text in storyboard block 602 to gradually conceal storyboard block 600.

FIG. 7B illustrates a GLOBAL transition category. A transition belonging to the GLOBAL transition category is a set of instructions that is separate from any storyboard block and that controls how adjacent storyboard blocks transition together. Transition 702 belongs to a GLOBAL transition category that overlaps both a trailing portion of storyboard block 600 and a leading portion of storyboard block 602. Thus, transition 702 exerts control over portions of both storyboard blocks 600 and 602. For example, transition 702 may be a crossfade between storyboard blocks 600 and 602.

FIG. 7C illustrates a GLOBAL CUT transition category. The GLOBAL CUT transition category is a subcategory of the GLOBAL transition category. A transition belonging to the GLOBAL CUT transition category is controlled by adjacent storyboard blocks. Transition 708 belongs to a GLOBAL CUT transition category and is controlled by transitions 704 and 706. Transition 704 belongs to an OUT transition category, and transition 706 belongs to an IN transition category. For example, storyboard blocks 600 and 602 may have transparent backgrounds, and transition 708 may provide a solid color background that smooths the otherwise hard cut between storyboard blocks 600 and 602.

Based on determining one or more transition placements, a digital video editing system may select one or more transitions for connecting a pair of adjacent storyboard blocks. As mentioned in the examples above, the one or more transitions may be selected based on one or more audio and/or visual characteristics of the adjacent storyboard blocks.

Timeline Modification

When a user-specified media element is included in a storyboard block, a proportional change in duration of the storyboard block can cause one or more transitions to become visually unappealing. For example, a storyboard block may be designed to be five seconds long with a one-second transition. However, a user may include a thirty-second video clip in the storyboard block, thereby causing the one-second transition to become six seconds in length.

To avoid this visually unappealing result, different portions of a storyboard block may be designed to have a fixed duration or a variable duration. For example, FIG. 8A illustrates a storyboard block 800 that has both an IN transition 802 and an OUT transition 804. Each transition may be flagged as having a fixed duration. Furthermore, any portion 806, 810 of the storyboard block 800 that is adjacent to a transition 802, 804 may also be flagged as having a fixed duration. Any remaining portion 808 of the storyboard block 800 may be flagged as having a variable duration.

In some example embodiments, a user may customize variable duration portion 808 to a desired length. Additionally or alternatively, a digital video editing system may automatically modify the variable duration portion 808 to an aesthetically pleasing length. FIG. 8B illustrates a minimum length that storyboard block 800 can be while continuing to have visually appealing transitions.

In some example embodiments, a storyboard block may be designed to have an entirely variable duration. For example, all of storyboard block 800 may be edited to be of variable duration if making the total duration of storyboard block 800 shorter than that illustrated in FIG. 8B is desirable. As long as storyboard block 800 fits within a transition duration of an adjacent block, proper functioning will be maintained. Thus, storyboard blocks may be customized to have a duration of even one second or less so that are remain visually appealing.

Sample Operation

Figure 9:
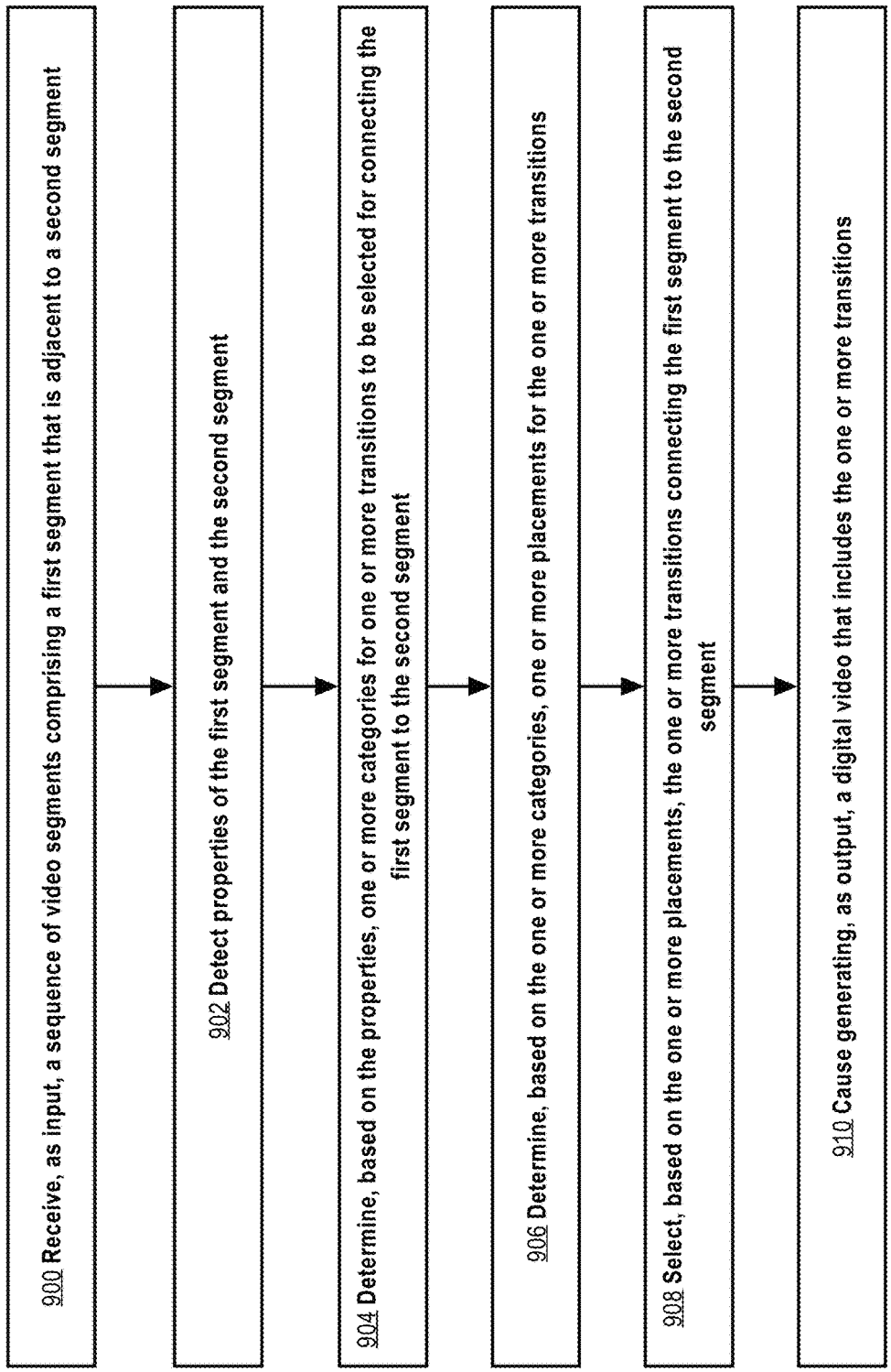
FIG. 9 is a flowchart that illustrates an approach for intelligent selection of scene transitions.

FIG. 9 is a flowchart that illustrates an approach for intelligent selection of scene transitions. At block 900, a digital video editing system receives, as input, a sequence of video segments comprising a first segment that is adjacent to a second segment. In some example embodiments, the video segments may be storyboard blocks. Additionally or alternatively, a user may have specified the sequence based on accepting or modifying a predefined ordering, such as that of a storyboard template.

At block 902, the digital video editing system detects properties of the first segment and the second segment. The properties may be media elements that are included in the first segment and second segment. For example, the digital video editing system may detect metadata in the first segment and the second segment indicating which media elements are included. Additionally or alternatively, the properties may be types of video segments. For example, the digital video editing system may detect the name of the first segment to be "Media Only" and the name of the second segment to be "Logo+Media". Additionally or alternatively, the properties may be colors that are included in the first segment and the second segment.

At block 904, the digital video editing system determines one or more transition categories based on the properties. The one or more transition categories may be determined based on a number of categorization rules that correlate transition categories to properties.

At block 906, the digital video editing system determines one or more transition placements based on the one or more transition categories, which indicate whether a particular video segment exerts control over or is controlled by a transition. In some example embodiments, the digital video editing system may modify a duration of a video segment when determining the one or more transition placements.

At block 908, the digital video editing system selects one or more transitions to connect the first segment and the second segment. The one or more transitions may be selected based on the one or more placements. For example, a placement at the front of a video segment may indicate that a transition should match one or more characteristics of the video segment.

Blocks 900-908 may be iteratively performed until one or more transitions are selected for each pair of adjacent video segments in the sequence. At block 910, the digital video editing system causes generating, as output, a digital video that includes the one or more transitions.

Basic Computing Device

Referring now to FIG. 10, it is a block diagram that illustrates a basic computing device 1000 in which software-implemented processes of the subject innovations may be embodied. Computing device 1000 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 1000 may include a bus 1002 or other communication mechanism for addressing main memory 1006 and for transferring data between and among the various components of device 1000.

Computing device 1000 may also include one or more hardware processors 1004 coupled with bus 1002 for processing information. A hardware processor 1004 may be a general purpose microprocessor, a system on a chip (SoC), or other processor suitable for implementing the subject innovations.

Main memory 1006, such as a random access memory (RAM) or other dynamic storage device, also may be coupled to bus 1002 for storing information and instructions to be executed by processor(s) 1004. Main memory 1006 also may be used for storing temporary variables or other intermediate information during execution of software instructions to be executed by processor(s) 1004.

Such software instructions, when stored in non-transitory storage media accessible to processor(s) 1004, render computing device 1000 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1000 also may include read only memory (ROM) 1008 or other static storage device coupled to bus 1002 for storing static information and instructions for processor(s) 1004.

One or more mass storage devices 1010 may be coupled to bus 1002 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1010 (e.g., the main hard disk for the device) stores a body of program and data for directing operation of the computing device, including an operating system, user application programs, driver and other support files, as well as other data files of all sorts.

Computing device 1000 may be coupled via bus 1002 to display 1012, such as a liquid crystal display (LCD) or other electronic visual display, for displaying information to a computer user. In some configurations, a touch sensitive surface incorporating touch detection technology (e.g., resistive, capacitive, etc.) may be overlaid on display 1012 to form a touch sensitive display for communicating touch gesture (e.g., finger or stylus) input to processor(s) 1004.

An input device 1014, including alphanumeric and other keys, may be coupled to bus 1002 for communicating information and command selections to processor 1004. In addition to or instead of alphanumeric and other keys, input device 1014 may include one or more physical buttons or switches such as, for example, a power (on/off) button, a "home" button, volume control buttons, or the like.

Another type of user input device may be a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

While in some configurations, such as the configuration depicted in FIG. 10, one or more of display 1012, input device 1014, and cursor control 1016 are external components (i.e., peripheral devices) of computing device 1000, some or all of display 1012, input device 1014, and cursor control 1016 are integrated as part of the form factor of computing device 1000 in other configurations.

Functions of the disclosed systems, methods, and modules may be performed by computing device 1000 in response to processor(s) 1004 executing one or more programs of software instructions contained in main memory 1006. Such instructions may be read into main memory 1006 from another storage medium, such as storage device(s) 1010. Execution of the software program instructions contained in main memory 1006 cause processor(s) 1004 to perform the functions of the disclosed systems, methods, and modules.

While in some implementations, functions of the disclosed systems and methods are implemented entirely with software instructions, hard-wired or programmable circuitry of computing device 1000 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor(s) 1004 for execution. For example, the instructions may initially be carried on a magnetic disk or solid-state drive of a remote computer. The remote computer can load the instructions into its dynamic memory and send the instructions over a telephone line using a modem. A modem local to computing device 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor(s) 1004 retrieves and executes the instructions. The instructions received by main memory 1006 may optionally be stored on storage device(s) 1010 either before or after execution by processor(s) 1004.

Computing device 1000 also may include one or more communication interface(s) 1018 coupled to bus 1002. A communication interface 1018 provides a two-way data communication coupling to a wired or wireless network link 1020 that is connected to a local network 1022 (e.g., Ethernet network, Wireless Local Area Network, cellular phone network, Bluetooth wireless network, or the like). Communication interface 1018 sends and receives electrical, electromagnetic, or optical signals that carry digital data streams representing various types of information. For example, communication interface 1018 may be a wired network interface card, a wireless network interface card with an integrated radio antenna, or a modem (e.g., ISDN, DSL, or cable modem).

Network link(s) 1020 typically provide data communication through one or more networks to other data devices. For example, a network link 1020 may provide a connection through a local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network(s) 1022 and Internet 1028 use electrical, electromagnetic or optical signals that carry digital data streams. The signals through the various networks and the signals on network link(s) 1020 and through communication interface(s) 1018, which carry the digital data to and from computing device 1000, are example forms of transmission media.

Computing device 1000 can send messages and receive data, including program code, through the network(s), network link(s) 1020 and communication interface(s) 1018. In the Internet example, a server 1030 might transmit a requested code for an application program through Internet 1028, ISP 1026, local network(s) 1022 and communication interface(s) 1018.

The received code may be executed by processor 1004 as it is received, and/or stored in storage device 1010, or other non-volatile storage for later execution.

Basic Software System

Figure 11:
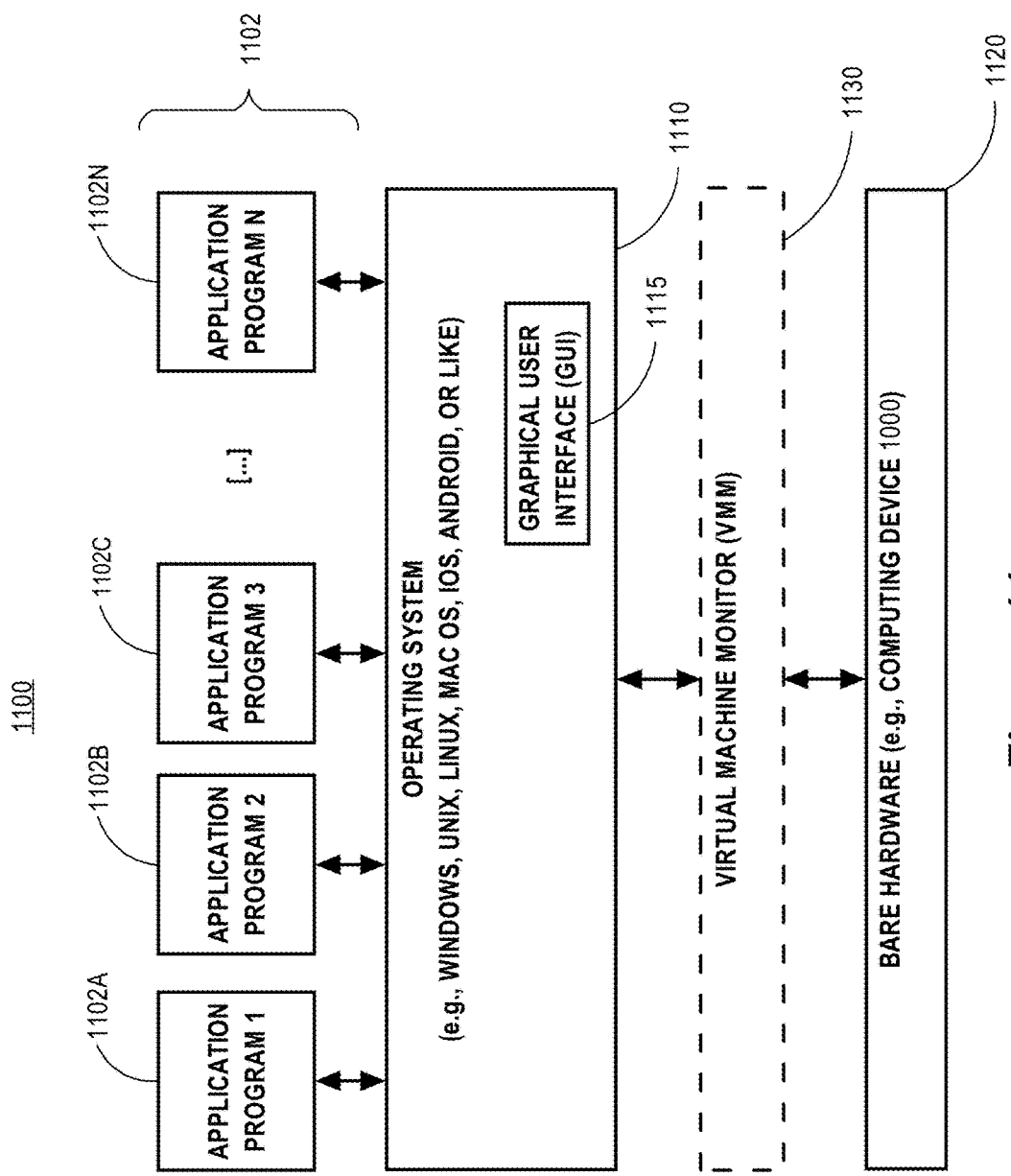
FIG. 11 is a block diagram of an example software system upon which an embodiment may be implemented.

FIG. 11 is a block diagram of a basic software system 1100 that may be employed for controlling the operation of computing device 1000. Software system 1100 and its components, including their connections, relationships, and functions, is meant to be exemplary only, and not meant to limit implementations of the subject innovations. Other software systems suitable for implementing the subject innovations may have different components, including components with different connections, relationships, and functions.

In various embodiments, software system 1100 is provided for directing the operation of computing device 1000. Software system 1100, which may be stored in system memory (RAM) 1006 and on fixed storage (e.g., hard disk or flash memory) 1010, includes a kernel or operating system (OS) 1110. The OS 1110 manages low-level aspects of computer operation, including managing execution of processes, memory allocation, file input and output (I/O), and device I/O. One or more application programs, represented as 1102A, 1102B, 1102C . . . 1102N in FIG. 11, may be "loaded" (e.g., transferred from fixed storage 1010 into memory 1006) for execution by the system 1100. The applications or other software intended for use on device 1100 may also be stored as a set of downloadable computer-executable instructions, for example, for downloading and installation from an Internet location (e.g., a Web server).

Software system 1100 may include a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of device 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the device 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of device 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

The above-described basic computer hardware and software is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A method comprising:
  receiving, as input, a sequence of storyboard blocks comprising a first storyboard block that is adjacent to a second storyboard block, each storyboard block of the sequence of storyboard blocks being generated from a respective template of a plurality of templates, each template of the plurality of templates specifying at least one type of media element;
  detecting one or more types of media elements included in the first storyboard block and the second storyboard block;
  based on the one or more types of media elements included in the first storyboard block and the second storyboard block, determining one or more categories for one or more transitions for connecting the first storyboard block to the second storyboard block;
  based on the one or more categories for the one or more transitions, determining one or more placements for the one or more transitions;
  causing generation of output comprising a digital video that includes the one or more transitions connecting the first storyboard block to the second storyboard block; and wherein the method is performed by one or more computing devices.

2. The method of claim 1, wherein the one or more types of media elements comprise a text media element, an image media element, or a video media element.

3. The method of claim 1, wherein based on the one or more types of media elements included in the first storyboard block and the second storyboard block, determining the one or more categories for the one or more transitions for connecting the first storyboard block to the second storyboard block comprises:
   traversing a set of prioritized rules to identify a highest rule that applies to the one or more types of media elements included in the first storyboard block and the second storyboard block; and
   identifying the one or more categories specified by the highest rule.

4. The method of claim 1, wherein the one or more categories indicate that the one or more transitions include a transition controlled by the second storyboard block.

5. The method of claim 1, wherein the one or more categories indicate that the one or more transitions include a transition controlled by the first storyboard block.

6. The method of claim 1, wherein the one or more categories indicate that none of the one or more transitions are controlled by the first storyboard block.

7. The method of claim 1, wherein the one or more categories indicate that none of the one or more transitions are controlled by the second storyboard block.

8. The method of claim 1, wherein based on the one or more categories for the one or more transitions, determining the one or more placements for the one or more transitions comprises:
   causing a trailing portion of the first storyboard block to overlap a leading portion of the second storyboard block.

9. The method of claim 1, wherein based on the one or more categories for the one or more transitions, determining the one or more placements for the one or more transitions comprises:
   causing a leading portion of the second storyboard block to overlap a trailing portion of the first storyboard block.

10. The method of claim 1, wherein based on the one or more categories for the one or more transitions, determining the one or more placements for the one or more transitions comprises:
    causing a trailing portion of the first storyboard block and a leading portion of the second storyboard block to overlap a transition of the one or more transitions.

11. A system comprising:
    storage media;
    one or more processors; and
    one or more programs stored in the storage media and configured for execution by the one or more processors, the one or more programs comprising a sequence of instructions for:
    receiving, as input, a sequence of storyboard blocks comprising a first storyboard block that is adjacent to a second storyboard block, each storyboard block of the sequence of storyboard blocks being generated from a respective template of a plurality of templates, each template of the plurality of templates specifying at least one type of media element;
    detecting one or more types of media elements included in the first storyboard block and the second storyboard block;
    based on the one or more types of media elements included in the first storyboard block and the second storyboard block, determining one or more categories for one or more transitions for connecting the first storyboard block to the second storyboard block;
    based on the one or more categories for the one or more transitions, determining one or more placements for the one or more transitions; and
    causing generation of output comprising a digital video that includes the one or more transitions connecting the first storyboard block to the second storyboard block.

12. The system of claim 11, wherein the one or more types of media elements comprise a text media element, an image media element, or a video media element.

13. The system of claim 11, wherein based on the one or more types of media elements included in the first storyboard block and the second storyboard block, determining the one or more categories for the one or more transitions for connecting the first storyboard block to the second storyboard block comprises:
    traversing a set of prioritized rules to identify a highest rule that applies to the one or more types of media elements included in the first storyboard block and the second storyboard block; and
    identifying the one or more categories specified by the highest rule.

14. The system of claim 11, wherein the one or more categories indicate that the one or more transitions include a transition controlled by the second storyboard block.

15. The system of claim 11, wherein the one or more categories indicate that the one or more transitions include a transition controlled by the first storyboard block.

16. The system of claim 11, wherein the one or more categories indicate that none of the one or more transitions are controlled by the first storyboard block.

17. The system of claim 11, wherein the one or more categories indicate that none of the one or more transitions are controlled by the second storyboard block.

18. The system of claim 11, wherein based on the one or more categories for the one or more transitions, determining the one or more placements for the one or more transitions comprises:
    causing a trailing portion of the first storyboard block to overlap a leading portion of the second storyboard block.

19. The system of claim 11, wherein based on the one or more categories for the one or more transitions, determining the one or more placements for the one or more transitions comprises:
    causing a leading portion of the second storyboard block to overlap a trailing portion of the first storyboard block.

20. The system of claim 11, wherein based on the one or more categories for the one or more transitions, determining the one or more placements for the one or more transitions comprises:
    causing a trailing portion of the first storyboard block and a leading portion of the second storyboard block to overlap a transition of the one or more transitions.

* * * * *